United States Patent [19]

Ikeda

[11] 3,785,658

[45] Jan. 15, 1974

[54] CASSETTE-TYPE MAGNETIC TAPE RECORDING AND REPRODUCING APPARATUS

[75] Inventor: Hisao Ikeda, Osaka, Japan

[73] Assignee: Matsushita Electric Industrial Co., Ltd., Osaka, Japan

[22] Filed: July 15, 1971

[21] Appl. No.: 165,790

Related U.S. Application Data

[62] Division of Ser. No. 783,947, Dec. 16, 1968, Pat. No. 3,622,162.

[52] U.S. Cl. .................. 274/4 C

[51] Int. Cl. .................. G11b 5/00

[58] Field of Search .................. 274/4 C, 4 D, 4 E, 274/4 H, 4 J, 11 C, 11 D; 179/100.2 Z

[56] References Cited

UNITED STATES PATENTS

| | | | |
|---|---|---|---|
| 2,612,565 | 9/1952 | Heller | 179/100.2 Z |
| 3,037,093 | 5/1962 | Nowlan | 274/4 C |
| 3,248,066 | 4/1966 | Andrews | 274/4 C |
| 3,416,150 | 12/1968 | Lingberg | 274/4 H |
| 3,488,058 | 1/1970 | Staar | 274/4 E |

*Primary Examiner*—Harry N. Haroian
*Attorney*—Stevens, Davis, Miller & Mosher

[57] ABSTRACT

A double recording preventing means for use in a small-sized cassette tape recording and reproducing apparatus including a manual operation mode change-over lever and a hole sensing lever taking two different positions depending upon the presence and absence of a double recording preventing hole in a cassette to be recorded or reproduced, and a manual record lever for actuating a record switch through a switching lever in accordance with the position of the hole sensing lever in association with the operation of the change-over lever. On a base plate of the apparatus mounting a slidable plate carrying transducer heads and a pinch roller, the means comprises a projection in the slidable plate, a hook-like projection of the hole sensing lever, and first and second cutouts of the switching lever engageable with respectively the above-mentioned projections, the projection of the hole sensing lever being engaged with the first cutout in the presence of the double recording preventing hole to render the switching lever immovable, while in the absence of such a hole, the projection of the slidable head carrying plate being allowed to be engaged with the second cutout of the switching lever and shift the switching lever into the recording operating state of the apparatus by simultaneous actuations of the record lever and the operation mode change-over lever.

3 Claims, 5 Drawing Figures

PATENTED JAN 15 1974 3,785,658

SHEET 2 OF 3

CASSETTE-TYPE MAGNETIC TAPE RECORDING AND REPRODUCING APPARATUS

This application is division of U.S. Ser. No. 783,947 filed Dec. 16, 1968 now U.S. Pat. No. 3,622,162.

This invention relates to a cassette-type magnetic tape recording and reproducing apparatus and more particularly to such a cassette-type magnetic tape recording and reproducing apparatus of compact structure wherein secondary operation switching means is cooperatively associated with primary operation-switching means for shifting a tape-driving system to a different state of operation, such as a state of recording or reproducing or a state or rewinding, in such a manner that when the primary operation switching means is shifted to a rewinding position, the state of rewinding and the state of fast forwarding are obtained selectively depending upon the position of the secondary operation switching means.

Magnetic tape recorders of the type which is designed for use with a cartridge tape and wherein different states of a tape-driving system, i.e., the recording state, the reproducing state, the fast forwarding state, the rewinding state and the inoperative state, are selectively obtained by operating operation switching means, are well known. For instance, German Utility Model No. 1,896,300 discloses a casette-type magnetic tape recorder of the type which has an opening formed in one side wall of an outer casing for the introduction of a tape-running mechanism and a pinch roller and another opening formed in the bottom wall of said casing for the introduction of a driving rotary shaft therethrough.

However, without exception the conventional magnetic tape recorders of the type described have been complicated in operation due to their structure, and no magnetic tape recorder has even been made available which performs all of the functions possessed by conventional large-sized magnetic tape recorders, in so small a size as to be portable and which provides high performance.

The present invention contemplates the provision of a cassette-type magnetic tape recording and reproducing apparatus which overcomes the aforesaid drawbacks, e.g., such a cassette-type magnetic tape recording and reproducing apparatus which is so designed that all of the operations can be obtained by operating two levers; which is provided with many new means, such as cassette-removing means and dual recording preventing means; and which yet is extremely small in size.

It is an object of the present invention to provide a cassette-type magnetic tape recording and reproducing apparatus which comprises operation and switching means for shifting a tape-driving system to selectively obtain different states of operation such as a state of recording or reproduction and a state of rewinding, a movable base plate carrying a recording and reproducing head thereon and operatively connected to said operation switching means, a dual recording preventing lever adapted to take two different positions depending upon the type of tape cartridge mounted on the apparatus, recording operating means, a switching lever operatively connected to said recording operating means to be operated thereby, said switching lever being normally held in engagement with said dual recording preventing means but brought into engagement with said movable base plate when operated from said recording operating means after the engagement between it and the dual recording preventing means is released by the type of tape cartridge mounted on the apparatus, and a recording switch for shifting an electric system of the apparatus to the state of recording, the arrangement being such that said recording switch is actuated by said switching lever to shift the electric system to the state of recording only when said movable base plate is moved from said operation-switching means under such conditions that the engagement between the switching lever and the dual recording preventing lever is released upon displacement of said switching lever caused by the type of tape cartridge mounted on the apparatus and said switching lever is brought into engagement with the movable base plate by the operation of the recording operating means, whereby dual recording can be prevented positively in accordance with the type of tape cartridge, mounted on the apparatus because the recording operating means is rendered operable or not operable depending upon the position of the dual recording preventing means, and further the structure is rendered simple and compact in form because the rational and most positive means is employed to switch the recording switch, namely the recording switch is switched by the operation of both the recording operating means and the movable base plate operated from the operation-switching means.

Other objects, features and advantages of the invention will be better understood from the disclosures of U. S. Pat. No. 3,622,162 and co-pending application Ser. No. 163,039, filed July 15, 1971 and from the following detailed description taken in connection with the accompanying drawings in which.

The principle operating features of this invention, with respect to recording, reproducing, fast winding and rewinding, are described in U. S. Pat. No. 3,662,162 and the pertinent portions thereof are incorporated herein by reference. The mechanism of dual recording preventing means according to the invention will be described with reference to FIGS. 1 to 5 inclusive. An operation switching means 52 by which the driving system of the magnetic tape recording and reproducing apparatus is shifted to a recording (reproducing) state, rewinding state or fast forwarding state, and a recording operating lever 53 by which the electric circuit of the apparatus is shifted to the recording state, are rotatably mounted on a base plate 51 by a common shaft 54 on the both sides of said base plate.

Figure 1:
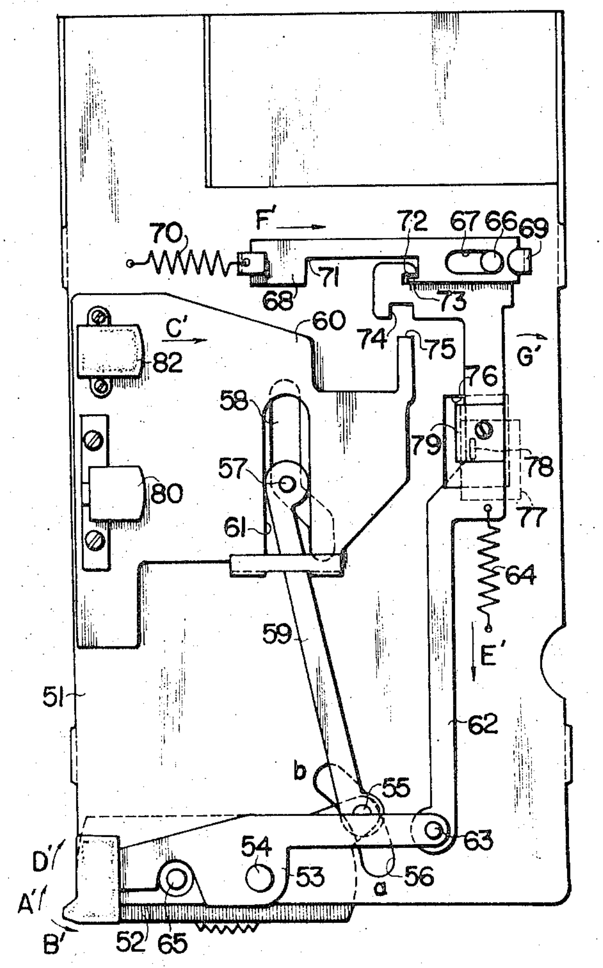
FIG. 1 is a top plan view mainly showing a dual recording preventing mechanism of the present apparatus.

The operation switching means 52 carries a pin 55 at one end portion thereof, which pin is received in an arcuate slot 56 formed in the base plate 51. The pin 55 is located at substantially the center of the slot 56 as shown in FIG. 1 when the apparatus is inoperative, but is moved to an end *a* of the slot, upon revolution of the operation-switching means 52 in the direction of arrow A′, placing the driving system in a recording or reproducing state and is moved to the other end *b* of the slot 56, upon revolution of the operation-switching means 52 in the direction of arrow 3′, placing the driving system in a rewinding or fast forwarding state.

A rod 59 has one end thereof rotatably connected to the pin 55, with the other end extending into a slot 61 formed in a movable base plate 60 and provided with a pin 57 which is received in a joggled slot 58 formed in the base plate 51, said movable base plate 60 being disposed on the base plate for sliding movement thereon in the direction of arrow C′.

The recording operating lever 53 has one end of a recording-reproduction switching lever 62 pivotally connected to one end thereof by a pin 63, the other end of said recording-reproduction lever being formed into the shape of a hook. The switching lever 62 is moved in the direction of arrow E′ incident to a revolution of the recording operating lever 53 in the direction of arrow D′.

The switching lever 62 is normally biased in a direction opposite to the direction of arrow E′ by the bias of a spring 64 which has one end anchored to said switching lever and the other end to the base plate 51. However, the movement of the switching lever 62 under the biasing force of the spring 64 is limited by the engagement between the recording operating lever 53 to which said switching lever is connected and a pin 65.

Adjacent to the hook-shaped end of the switching lever 62 is provided a dual recording preventing lever 68 which is slidable in the direction of arrow F′ identical to the direction in which the movable base plate 60 slides, with a slot 67 formed therein in engagement with a pin 66. The dual recording preventing lever 68 has a projection 69 formed at the outer end thereof for engagement with the rear end face of a tape cartridge when said tape cartridge is inserted in the apparatus. Further, a spring 70 is provided with one end anchored to the lever 68 and the other end to the base plate 51, so as to bias the projection 69 inwardly.

The lever 68 has a notch 71 formed in the central portion of the inside edge thereof and a projection 73 is formed at the edge of said notch 71, which is adapted to be received in a recess 72 formed in the hook-shaped end of the lever 62 in the sliding direction of said lever 68. The movable base plate 60 has a projection 75 which is adapted to be received in another recess 74 formed in the hook-shaped end of the switching lever 62.

The switching lever 62 has an engaging member 79 fitted thereto and this engaging member is extending downwardly through a hole 76 in the base plate 51 and adapted to cause a sliding movement of an operating member 78 to switch a recording switch 77, provided on the underside of the base plate 51, when said switching lever is pivoted around the pin 63 in the direction of arrow G′. Reference numerals 80 and 82 designate a recording-reproducing head and an erasing head respectively which are mounted on the movable base plate 60, and reference numeral 81 designates a tape cartridge.

The mechanism constructed as described above operates in the following manner: Namely, in an inoperative position shown in FIG. 1 the operation switching means 52 and the recording operating lever 53 are held in a position parallel to the edge of the base plate 51. Further, since a tape cartridge 81 (ordinary recordable cartridge tape) is not inserted, the dual recording preventing lever 68 is held in its forward position under the biasing force of the spring 70 and the movable base plate 60 is also held in its forward position. Still further, the projection 73 of the dual recording preventing lever 68 is received in the recess 72 of the switching lever 62, thereby preventing movement of the switching lever 62 in the direction of arrow E′. Namely, rotational movement of the recording operating lever 53 in the direction of arrow D′ is prevented and the recess 74 of the switching lever 62 is spaced apart from the projection 75 of the movable base plate 60.

Figure 2:
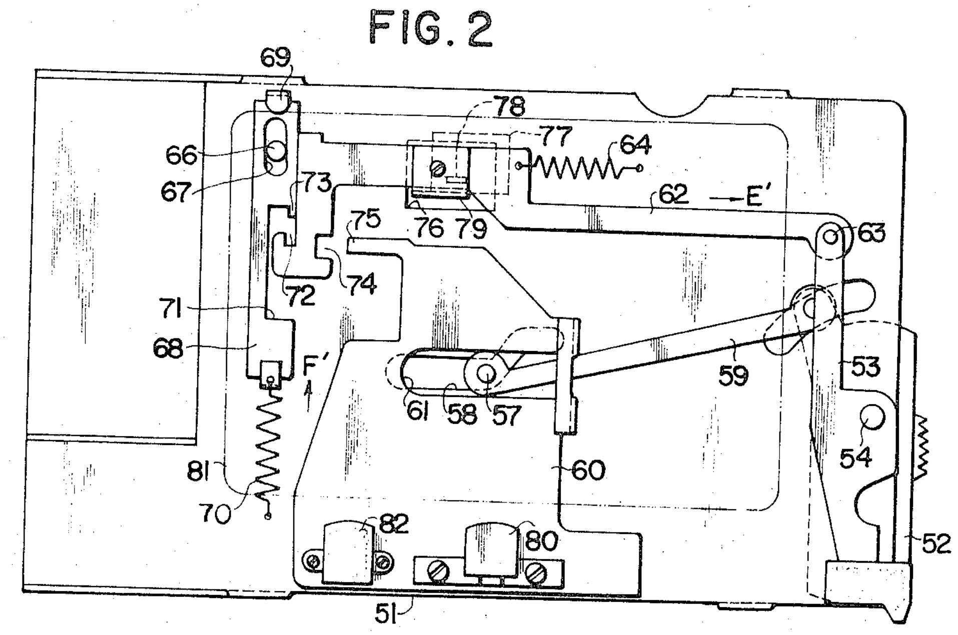
FIG. 2 is a fragmentary top plan view showing the position of a principal mechanism of the apparatus when a cassette is mounted on the apparatus.

When a tape cartridge 81 is mounted under the condition described above, the rear end face of the tape cartridge abuts against the projection 69 causing the dual recording preventing lever 68 to move in the direction of arrow F′ against the biasing force of the spring 70, so that the engagement between the dual recording preventing lever 68 and the switching lever 62 is released as shown in FIG. 2.

The operation switching means 52 is revolved in the direction of arrow A′ in this state, whereupon the rod 59 is displaced with the pin 57 sliding in the joggled slot 58 in the base plate 51 and thereby the movable base plate 60 is moved rearwardly in the direction of arrow C′, carrying the recording-reproducing head 80 into pressure contact with a tape in the tape cartridge 81 and at the same time the tape-driving system interior of the apparatus is placed in the state of normal forwarding operation to forward the tape. Since the recording switch 77 is not actuated by this operation, the electric circuit system interior of the apparatus is set in the state of reproduction and accordingly the content records on the tape is reproduced by the recording and reproducing head 80. The reproduction state described above can be shifted to the recording state by revolving the recording operating lever 53 in the direction of arrow D′ with the tape cartridge 81 mounted in the apparatus and revolving the operation-switching means 52 in the direction of arrow A′ while holding the recording operating lever 53 in the revolved position.

Figure 3:
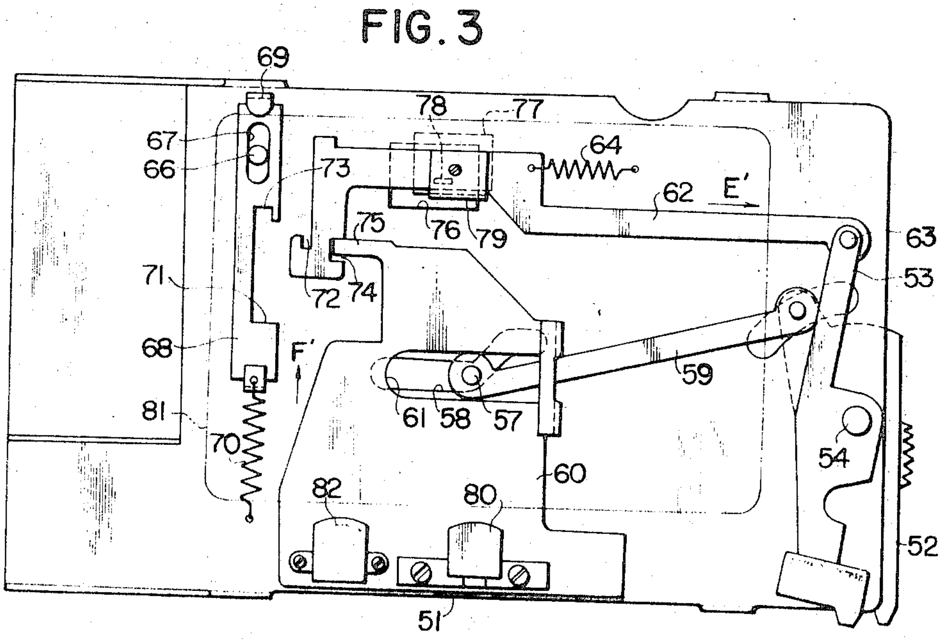
FIGS. 3 and 4 are top plan views showing the positions of the principal mechanism during operation of the apparatus.
Figure 4:
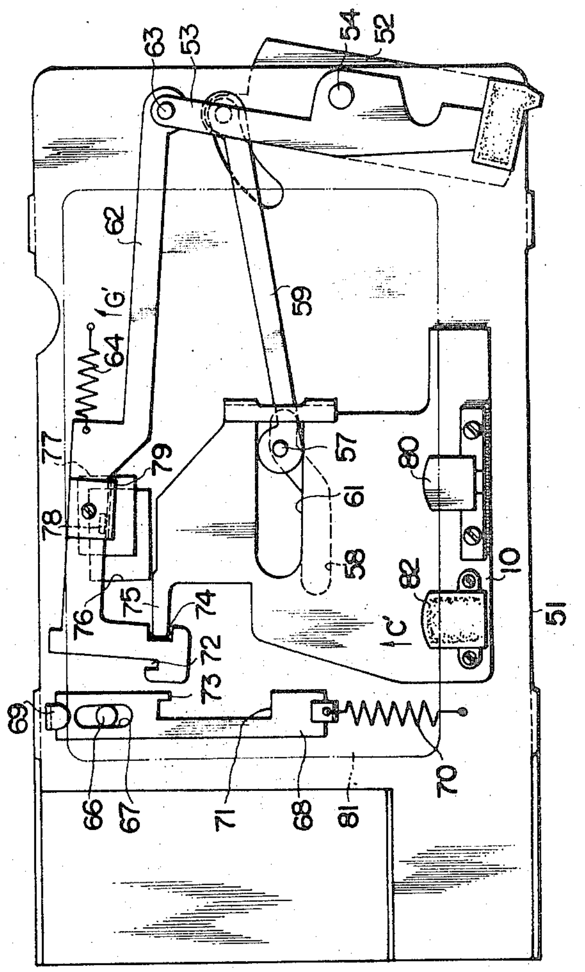
Figure 5:
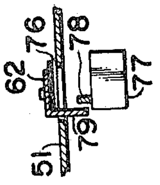
FIG. 5 is a side view, in section, of recording switching elements in the mechanism.

Namely, when the recording operating lever 53 is revolved in the direction of arrow D′, the switching lever 62 is displaced in the direction of arrow E′ against the biasing force of the spring 64 and thereby the recess 74 at the hook-shaped end of said switching lever is brought into engagement with the projection 75 of the movable base plate 60 as shown in FIG. 3. Then, the operation-switching means 52 is revolved in the direction of arrow A′, whereby the movable base plate 60 is moved in the direction of arrow C′ and the switching lever 62 is caused to rotate in the direction of arrow G′ about the pin 63 by the projection 75. As a result, the operating member 78 of the recording switch 77 is actuated by the engaging member 79 carried on the switching lever 62 as shown in FIG. 4 and thus the electric circuit system is shifted to provide for recording. In this case, the tape driving system has already been set for normal forwarding of the tape by the revolution of the operation-switching means 52 in the direction of arrow A′. Therefore, the apparatus is ready for recording.

In the reproducing state and the recording state described above, the movable base plate 60, the recording operating lever 53, the switching lever 62 and the recording switch 77 are held in their respective positions by retainer means (not shown) which holds the operation switching means 52 in its revolved position.

The recording state mentioned above can be released by returning the operation switching means 52 to its original inoperative position. Namely, by revolving the operation-switching means to its original position the movable base plate 60 is returned to its original position and simultaneously the switching lever 62 is returned to its original position, so that the recording switch 77 is switched to return the electric circuit system to the reproducing state and the recording operating lever 53 is also returned to its original position since the switching lever 62 is returned under the biasing force of the spring 64.

In order to obtain a state of rewinding or fast forwarding, the operation-switching means 52 is revolved in the direction of arrow B′ with the tape cartridge 81 mounted in the apparatus. By this operation, the pin 57 at one end of the rod 59 moves only in the straight portion of the joggled slot 58 in the base plate 51 and the movable base plate 60 is held immovably. Therefore, the recording and reproducing head 80 is not brought into pressure contact with the tape in the tape cartridge 81 and the tape-driving system only is shifted to the state of rewinding or fast forwarding.

The recording state, reproducing state and rewinding or fast forwarding state of the apparatus are obtained in the manner described above and from the foregoing description it will be understood that the recording state is obtained by the revolution of the switching lever 62 in the direction of arrow G′ in engagement with the movable base plate 60, which is possible only after release of the engagement between the projection 73 of dual recording preventing lever 68 and the recess 72 of switching lever 62. In this view, a tape cartridge containing a tape which one does not desire to record again has a hole formed in the rear end face thereof at a location corresponding to the project 69 of dual recording preventing lever 68. Namely, when such a tape cartridge is inserted, the projection 69 of the dual recording preventing lever 68 is received in the aforesaid hole and the dual recording preventing lever remains in the same position as the inoperative position shown in FIG. 1. Therefore, the switching lever 62 is not permitted to move in the direction of arrow E′ and consequently the recording operating lever 53 cannot be revolved in the direction of arrow D′. Thus, dual recording can be prevented effectively.

What is claimed is:

1. Double recording preventing means for a cassette type magnetic tape recording and reproducing apparatus, comprising:

a base plate;

a sensing lever for detecting the presence and absence of a double-recording preventing opening in cassette mounted on the tape recording and reproducing apparatus, said sensing lever having a projection formed thereon and being mounted for movement relative to said base plate;

bias means for biasing said sensing lever in a first direction of motion;

a movable plate carrying magnetic transducing head means, said plate being mounted for movement relative to said base plate, and having a projection formed thereon;

a switching lever having first and second cutout portions formed therein;

said switching lever being mounted for movement between positions of engagement with the sensing lever projection and the movable plate projection;

a manually operated mode selector member coupled to said movable plate for moving said plate and the head means carried thereon between operative and inoperative positions relative to a cassette mounted on the tape recording reproducing apparatus;

record switch means for placing the apparatus into a record mode when actuated; and means for moving said switching lever to a first position of engagement with said sensing lever projection and out of contact with said movable plate, and to a second position of engagement with the movable plate projection, wherein movement of said plate to said operative position in said second position of engagement causes movement of said switching lever into contact with said record switch means to place said recording and reproducing apparatus into a record mode.

2. The device according to claim 1, in which said movable plate has an elongated slot engaged with a plate-like rod, said rod being operative along a guide slot in the base plate of the apparatus by said mode selector to slide the movable plate on the base plate to bring the apparatus into its operative state.

3. A double recording preventing device for a cassette-type magnetic tape recording and reproducing apparatus having a rotatable operation mode change-over means, a base plate, and a movable plate slidably disposed on the base plate and linearly operative by the operation of the operation mode change-over means, said movable plate carrying thereon magnetic transducer heads and a pinch roller, comprising: a projection provided at one end of the movable plate; a switching lever linked at one end with a manual record lever and having first and second cutouts at the other end thereof; a sensing lever adapted to take two different positions in accordance with the presence and absence of a double recording preventing opening in a cassette loaded into the apparatus, the sensing lever having a hook-like projection engageable with the first cutout of the switching lever in the presence of the double recording preventing opening to thereby make the switching lever immovable; the switching lever engaging at its second cutout while the projection of the movable plate by the actuation of the record lever in the absence of the double recording preventing opening, the switching lever thereafter being biased by the movement of the movable plate into its operative state, and an electric switch operative in response to the biasing of the switching lever for changing over an electric circuit for recording operation.

* * * * *